US009253513B1

(12) United States Patent
Finster et al.

(10) Patent No.: US 9,253,513 B1
(45) Date of Patent: Feb. 2, 2016

(54) INDEPENDENT MULTI-PANEL DISPLAY WITH CROSS-PANEL INTERACTIVITY (71) Applicant: Microsoft Corporation, Redmond, WA (US)

(72) Inventors: Diana Finster, Seattle, WA (US); Donald Keller, Kirkland, WA (US); Jonathan Winslow Anderson, Seattle, WA (US); Jason Scott White, Brooklyn, NY (US); Alexei Pineda, Bellevue, WA (US); Enrique de la Garza, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/480,614

(22) Filed: Sep. 8, 2014

(51) Int. Cl.
*G06F 3/00* (2006.01)
*H04N 21/234* (2011.01)
*G06Q 30/02* (2012.01)
*H04N 21/431* (2011.01)
*H04N 21/472* (2011.01)
*H04N 21/442* (2011.01)
*H04N 21/81* (2011.01)

(52) U.S. Cl.
CPC ...... *H04N 21/23424* (2013.01); *G06Q 30/0269* (2013.01); *H04N 21/4316* (2013.01); *H04N 21/44218* (2013.01); *H04N 21/472* (2013.01); *H04N 21/812* (2013.01)

(58) Field of Classification Search
CPC ............ H04N 5/44543; H04N 21/482; H04N 21/812; G06Q 30/0241; G06Q 30/02; G06Q 30/0267; G06Q 30/0258
USPC ............. 725/10, 34, 40, 42, 43, 44; 705/14.4, 705/14.57, 14.56
See application file for complete search history.

(56) References Cited

U.S. PATENT DOCUMENTS

| 6,018,768 | A | 1/2000 | Ullman et al. |
| 7,360,232 | B2 | 4/2008 | Mitchell |
| 7,703,041 | B2* | 4/2010 | Ito .......................... H04H 60/63 715/792 |
| 7,757,253 | B2* | 7/2010 | Rappaport ............ G06F 3/0482 725/41 |
| 8,522,308 | B2 | 8/2013 | Stinson, III |

(Continued)

FOREIGN PATENT DOCUMENTS

| WO | 2013114399 A2 | 8/2013 |
| WO | 2013114399 A3 | 10/2013 |

*Primary Examiner* — Oleg Asanbayev
(74) *Attorney, Agent, or Firm* — Dave Ream; Tom Wong; Micky Minhas (57) ABSTRACT

Improved operation of a content presentation device is achieved by one application, presenting content to users, automatically identifying an independent second application, available on the content presentation device, based on remotely-sourced information, and invoking that second application based on explicit or implicit user input. Bidirectional notifications are enabled between the two applications whereby activity within one application can affect the other. The first application displays an advertisement and can also, based on metadata received with the advertisement, identify the second application and invoke it, based upon explicit or implicit user action, such that both are simultaneously visible in separate content display areas on a physical display device. User interaction with the second application is independent of the display of the corresponding advertisement by the first application. The bidirectional notifications enable the second application to integrate with, respond to, or extend, content being presented by the first application.

20 Claims, 4 Drawing Sheets

(56) References Cited

U.S. PATENT DOCUMENTS

| | | | | |
|---|---|---|---|---|
| 8,571,935 B2* | 10/2013 | Geer, III | | G06Q 30/00 705/14.49 |
| 2002/0194264 A1* | 12/2002 | Uchiyama | | G06Q 20/123 709/203 |
| 2003/0172385 A1* | 9/2003 | Takatori | | H04N 5/4401 725/113 |
| 2009/0172724 A1* | 7/2009 | Ergen | | G06Q 30/02 725/32 |
| 2013/0024888 A1* | 1/2013 | Sivertsen | | H04N 21/4312 725/32 |
| 2013/0276010 A1* | 10/2013 | Drayson | | H04N 21/44222 725/14 |
| 2014/0111547 A1 | 4/2014 | Bilbrey et al. | | |
| 2014/0359659 A1* | 12/2014 | Tsuchiuchi | | H04N 21/4316 725/34 |

* cited by examiner

INDEPENDENT MULTI-PANEL DISPLAY WITH CROSS-PANEL INTERACTIVITY

BACKGROUND

Much of the content that is consumed by individuals is supported, at least in part, through advertising revenue. For example, network television shows, and, even prior to that, radio broadcasts, were funded through the sale of advertising wherein advertisers paid for the right to present advertisements to the audience of such shows and broadcasts. As another example, print media, such as magazines and newspapers, are paid by advertisers to include printed advertisements, with such advertiser payments reducing the amount subscribers of such print media would otherwise have to pay to access the content printed thereon.

Because a diverse set of individuals can consume various content, such as television shows, or newspapers, the advertising included with such content necessarily is exposed to both individuals to whom such advertising is relevant, and individuals that have no interest in the advertised product or service. Additionally, because information about the individuals consuming such content is often unavailable, it can be difficult to determine beforehand which advertising will be relevant. As a result, individuals have become accustomed to finding advertisements irrelevant for their particular needs and ignoring such advertisements. Indeed, many consumers of advertising-supported content have trained themselves to purposely ignore advertisements; a behavior known as "ad blindness". For example, readers of newspapers or magazines visually skip over advertisements often without noticing the advertisements sufficiently in order to actually determine whether or not such advertisements are of interest. As another example, watchers of network television shows often perform other actions during displayed advertising, or utilize devices, such as digital video recorders that enable such watchers to fast-forward or skip over advertising without actually considering the advertising content.

From an advertiser perspective, however, such actions are undesirable because such actions reduce the likelihood of individuals engaging with the advertiser's products or services. Consequently, advertisers desire advertisements that more effectively capture individuals' attention so that each individual can more completely consider the advertised product or service.

SUMMARY

User action directed to a first application program executing on a content presentation device can have user action directed to it that can invoke an independent second application program that was identified based on remotely-sourced information. Bidirectional notifications can be enabled between the two applications whereby activity within one application affects the other. Within a content consumption context, the first application can generate and display advertising-sponsored content to one or more users of such an application. During an advertising break in the advertising-sponsored content, the first application can display an advertisement received from a remote advertising server, and can also, based on metadata received with the advertisement, identify a second, independent application that the first application will invoke, based upon explicit or implicit user action, such that both the content being presented by the first application and the content being presented by the second application are simultaneously visible in separate content display areas on a physical display device. Bidirectional notifications can be enabled between the two applications such that the content being presented by the first application, including the advertising-sponsored content and the advertisement itself, can affect the content being presented by the second application, and vice versa. User interaction with the second application can continue after the first application has completed displaying the corresponding advertisement, and can continue during presentation, by the first application, of the advertising-sponsored content. The bidirectional notifications can enable the second application to integrate with, respond to, or extend, content being presented by the first application, thereby encouraging user interactivity, and providing benefit to users, while simultaneously increasing delivery of advertising content and, thereby, providing benefits to advertisers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to an improved operation of a content presentation device whereby one application program, executing on the content presentation device and presenting content to users through the physical rendering of such content on a physical display device that is communicationally coupled to the content presentation device, automatically identifies an independent second application, available to execute on the content presentation device, based on remotely-sourced information and invokes that second application based on explicit or implicit user action. Bidirectional notifications can be enabled between the two applications whereby activity within one application can affect the other. Within a content consumption context, the first application can generate and display advertising-sponsored content to one or more users of such an application. During an advertising break in the advertising-sponsored content, the first application can display an advertisement received from a remote advertising server, and can also, based on metadata received with the advertisement, identify a second, independent application that the first application will invoke, based upon explicit or implicit user action, such that both the content being presented by the first application and the content being presented by the second application are simultaneously visible in separate content display areas on a physical display device. Bidirectional notifications can be enabled between the two applications such that the content being presented by the first application, including the advertising-sponsored content and the advertisement itself, can affect the content being presented by the second application, and vice versa. User interaction with the second application can continue after the first application has completed displaying the corresponding advertisement, and can continue during presentation, by the first application, of the advertising-sponsored content. The bidirectional notifications can enable the second application to integrate with, respond to, or extend, content being presented by the first application, thereby encouraging user interactivity, and providing benefit to users, while simultaneously increasing delivery of advertising content and, thereby, providing benefits to advertisers.

The techniques described herein focus on advertising within the context of the consumption of advertising-sponsored content, which can be considered to be "user-desired content" in that the user wishes to consume such content and receives advertisements as a condition of consuming such content at a particular cost, which is typically a reduced cost, or free, due to the fact that such content is, at least in part, advertising-sponsored. However, such descriptions are not meant to suggest a limitation of the described techniques. To the contrary, the described techniques are equally applicable to any environment in which two separate applications can interoperate to the advantage of a user, where one application is automatically identified by the other based on remotely-sourced information and is invoked by either explicit or implicit user action.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including hand-held devices, multi-processor systems, microprocessor based or programmable consumer electronics, network PCs, mini-computers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and other like hardware logic components and devices.

Figure 1:
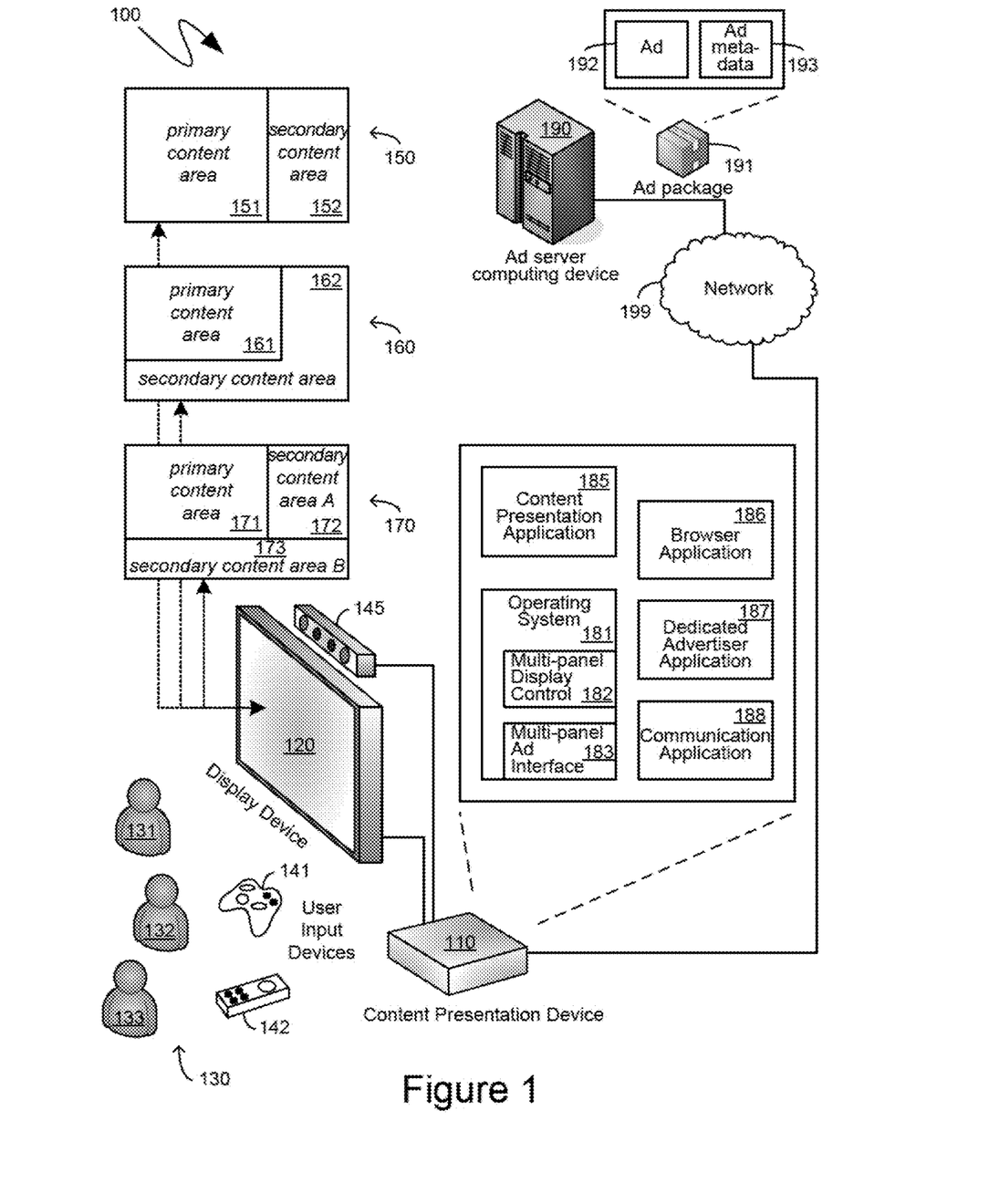
FIG. 1 is a block diagram of an exemplary system for simultaneously providing content from two separate applications to a user.

Turning to FIG. 1, an exemplary system 100 is illustrated, providing context for the descriptions below. As illustrated in FIG. 1, the exemplary system 100 can comprise a content presentation device 110 that can be communicationally coupled to a physical display device 120. The physical display device 120 can be any type of display device that can generate a viewable physical image, including Liquid Crystal Display (LCD) devices, plasma-based devices, Organic Light Emitting Diode (OLED) devices, phosphorus-based devices, and other like display devices. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The content presentation device 110 can be any device having sufficient processing capability to execute the computer-executable instructions, and perform the steps, described herein. For example, the content presentation device 110 can be a video game console, a digital video recorder, a set-top box provided by a content or network provider, or any of the above-enumerated computing devices. The content presentation device 110 can further comprise sufficient hardware and software capability to control a display device, such as the display device 120, in order to cause the display device 120 to generate images thereon. One or more users, such as the users 131, 132 and 133, collectively referred to as the users 130, can utilize the content presentation device 110 to consume content displayed by the content presentation device 110 via the physical display device 120. The users 130 can interface with the content presentation device 110 through various user input devices including, for example, a conventional remote control 142, a video game controller 141, an audio/visual input device 145, as well as more traditional computer input devices, such as a trackpad, a mouse, keyboard, and other like user input devices. As will be recognized by those skilled in the art, the audio/visual input device 145 can comprise sensors by which the physical appearance and physical movements of the user, as well as audio generated by the user, can be utilized to provide user input, such as to the content presentation device 110.

The content presentation device 110 can display, on the display device 120, content that can be consumed by multiple users, such as the users 130, simultaneously. In such instances, only some of the users 130 may be actively controlling the content presentation device 110, while others of the users 130 may be merely viewing the content being generated on the physical display device 120. Consequently, as utilized herein, the term "user" means any individual that consumes content presented by a device, irrespective of whether such an individual is actively controlling the device, or the content presented thereby, or is merely consuming the content without active control.

In certain instances, the content presented by the content presentation device 110 can include advertising-supported content. Such advertising-supported content can include television shows, movies, video games, and other like advertising-supported content. Typically, such advertising-supported content will have defined periods of time, defined instances, or defined circumstances during which advertisements can be presented. Such advertisement-presentation constructs are typically referred to as "ad breaks", and can include predefined blocks of time occurring at defined intervals during the presentation of advertising-supported content, such as television shows and movies, and can also include predefined blocks of time triggered by events within the context of a video game, such as when a game player exits the game to return to a "game center", when a game player completes a level, or other like triggering events.

The content presentation device 110 can be communicationally coupled with a network 199, through which the content presentation device 110 can obtain content to display to its users, including advertising-supported content. Also communicationally coupled to the network 199 can be an advertisement service, comprised of one or more advertisement service computing devices, such as the exemplary ad server computing device 190 shown in FIG. 1. The advertisement service can receive information, including information from the content presentation device 110, and can select advertisements to be displayed by the content presentation device 110 on the physical display device 120 as part of the presentation of advertising-supported content. Advertisements are often selected, by the advertisement service, based upon information regarding the audience to which such advertisements will be presented. For example, advertisements can be selected based upon the type of content with which they will be presented, such that content directed towards older viewers can receive advertisements for, for example, car insurance, while content directed toward younger viewers can receive advertisements for, for example, dolls or other toys.

Advertisements can also be selected based upon more specific information regarding the particular users that are being provided content from a particular content presentation device. For example, advertisements sent to the content presentation device 110 can be selected based upon information regarding the one or more of the users 130. More specifically, users, such as the users 130, can be invited to provide, or allow access to, certain personal information that can aid in the tailoring of the advertisements presented to such users. To protect users' privacy, users would be required to take one or more affirmative actions before their personal information could be collected, and, in the absence of such affirmative action, their personal information would not be collected. From the users' perspective, there can be meaningful benefits to allowing access to some discrete portion of their personal information. For example, such users may allow access to personal information simply because they desire more applicable advertising. As another example, users can be provided with additional services, or benefits, in exchange for providing, or allowing access to, some of their personal information. As yet another example, users can be compensated, either monetarily or through products and services, in exchange for providing, or allowing access to, some of their personal information.

According to one aspect, the content presentation device 110 can have executing thereon a content presentation application 185 that can display advertising-supported content on the display device 120. For example, the content presentation application 185 can be a video player application, a video game, or other like content presentation application. According to such an aspect, the content presentation application 185 can, if one or more of the users 130 have so authorized, collect information regarding the users 130 and the content presentation device 110. Such information can then be provided, by the content presentation application 185, to the advertisement service, such as through communications between the content presentation device 110 and the ad server computing device 190, via the network 199. For example, the content presentation application 185 can inform the advertisement service that the content presentation device 110, on which the content presentation application 185 is executing, also has installed thereon a dedicated advertiser application 187. Such a dedicated advertiser application 187 can be an application specifically designed by an advertiser to provide user-advantageous functionality while simultaneously advertising a product or service. For example, a pizza building and ordering application can be one type of dedicated advertiser application 187. Upon receiving such information, the advertisement service can select one or more advertisements to be displayed by the content presentation application 185.

More specifically, the advertisement service can take into account various factors in selecting which advertisements to provide to the content presentation application 185 to be displayed to the users 130. Such factors can include traditional advertising factors such as, for example, the age group of the target audience of the content being presented by the content presentation application 185, the amount of money an advertiser will pay to the advertising service in exchange for the advertising service providing that advertiser's advertisement to the content presentation application 185 for subsequent presentation to the users 130, and other like traditional advertising factors.

According to one aspect, however, additional factors can also be considered by the advertising service in order to facilitate the mechanisms described herein. Such additional factors can include information regarding other, independent application programs that a user may have installed on their content presentation device, such as the aforementioned dedicated advertiser application 187. Other relevant applications can include communication applications, such as exemplary communication application 188, which can be utilized by one or more of the users 130 to participate a communication session with one or more other local or remotely located individuals. For example, the exemplary communication application 188 can enable one or more of the users 130 to participate in an audio or video call or teleconference utilizing the content presentation device 110 and corresponding input devices, such as the exemplary audio/visual input device 145. As another example, the exemplary communication application 188 can enable one or more of the users 130 to participate in a chat session, exchange textual, audio or video messages, and other like forms of communication. The relevant applications can also include browser applications, such as exemplary browser application 186, that can present content sourced remotely from the content presentation device 110, and obtained via communications across the network 199. The browser application 186, dedicated advertiser application 187 and communication application 188 are merely exemplary, and the content presentation application 185 can inform the advertising service of other types of applications installed on the content presentation device 110.

Other factors that can also be considered by the advertising service in order to facilitate the mechanisms described herein can include the quantity of the users 130 that are currently consuming content being presented by the content presentation application 185 via the display device 120, the engagement of such users 130, such as could be determined by reference to inputs received through the audio/visual input device 145, and other like user information. Again, such information would only be provided by the content presentation application 185, to the advertising service, should the user have authorized such a presentation.

Still other factors that can be considered by the advertising service can include information regarding the hardware of the content presentation device 110, including the size and nature of the display device 120, as well as the presence of various user input devices, and which of those user input devices are currently being utilized. For example, if the content presentation application 185 is a video game, then the content presentation application 185 can inform the advertising service that the users 130 are using game controller input devices, such as the exemplary game controller input device 141, to provide user input to the content presentation device 110. Conversely, if the content presentation application 110 is a video application through which the users 130 are watching a television show or a movie, then the content presentation application 185 can inform the advertising service that the users 130 are using the remote control 142 to provide input to the content presentation device 110. As yet another example, the content presentation application 185 can inform the advertising service of the presence, or absence, of specific types of user input devices such as, for example, the audio/visual input device 145. Thus, in the exemplary system 100 shown in FIG. 1, the content presentation application 185 can inform the advertising service that the content presentation device 110, on which the content presentation application 185 is executing, has an audio/visual input device 145 communicationally coupled thereto.

In response to the information received by the content presentation device 110, an advertising service can select one or more advertisements to be displayed by the content presentation application 185 as part of the presentation, by the content presentation application 185, of advertising-supported content. For example, the advertising service can enable advertisers to specify criteria under which their advertisements are to be presented, or to be explicitly not presented. Consequently, as one example, an advertiser seeking to generate an advertising campaign that relies upon, for example, the dedicated advertiser application 187, can specify, to the advertising service, that advertisements of such a campaign are only to be provided to content presentation applications 185 that are executing on content presentation devices 110 on which the dedicated advertiser application 187 is also installed. As another example, an advertiser seeking to generate an advertising campaign that seeks to target groups of users, for example, can specify, to the advertising service, that one or more advertisements are only to be provided to content presentation applications 185 that are currently presenting content to multiple users, such as, for example, the users 130.

Once an advertising service selects an advertisement to be displayed by the content presentation application 185, the advertising service can generate an advertisement package, such as the exemplary advertisement package 191, and can provide such an advertisement package 191 to the content presentation application 185, such as through network communications via the network 199. According to one aspect, an advertisement package, such as the exemplary advertisement package 191, can include the advertisement itself, such as exemplary advertisement 192, as well as advertisement metadata, such as, for example, the advertisement metadata 193. The advertisement metadata 193 can comprise information specifying the types of interactivity that can be enabled or utilized by the exemplary advertisement 192, information associated with the pricing of the advertisement, information regarding historical or previous user engagement with the type of the exemplary advertisement 192, as well as other like information about the exemplary advertisement 192. In addition, the advertisement metadata, such as exemplary advertisement metadata 193, can specify another application that the content presentation application 185 can invoke to simultaneously provide additional user experience. For example, the advertisement metadata 193 can specify that the content presentation application 185, as part of the displaying of the advertisement 192, can also invoke the dedicated advertiser application 187 and cause such a dedicated advertiser application 187 to simultaneously provide content to the users 130. More specifically, the advertisement metadata 193 can specify under which conditions the content presentation application 185 is to invoke the dedicated advertiser application 187. Alternatively, or in addition, the content presentation application 185 can invoke such a dedicated advertiser application 187 in response to either implicit or explicit user input. For example, the content presentation application 185 can, such as during the display of the advertisement 192, display information, to the users 130, such as via the display device 120, indicating the potential for such users to be provided with an additional experience via the dedicated advertiser application 187 and requesting explicit user authorization to invoke the dedicated advertiser application 187. As another example, the content presentation application 185 can, such as during the display of the advertisement 192, monitor user engagement with the advertisement 192, such as via the audio/video input device 145, and can only invoke the dedicated advertiser application 187 if the users 130 appeared engaged. As before, such monitoring of user engagement can be limited by the user, such as through previously established user settings.

Consequently, once the content presentation application 185 receives the advertisement package 191, such as from the advertising server computing device 190, the content presentation application 185 can display the advertisement 192, to the users 130, via the display device 120, at an appropriate time, such as during an ad break in the primary content that is being presented by the content presentation application 185. Additionally, the content presentation application 185 can identify another application, such as the browser application 186, the dedicated advertiser application 187, or the communication application 188, based upon the information provided in the advertisement metadata 193. Upon receiving an appropriate user input, which, as indicated, can be an explicit or implicit user input, the content presentation application 185 can cause such another application to execute on the content presentation device 110 and simultaneously display additional content.

For example, if the content presentation application 185 displays a notification to the users 130 requesting their permission to invoke another application and have it display content simultaneously, and the users 130 provide such permission, then the content presentation application 185 can proceed to invoke such other application, as identified by the advertisement metadata 193, in response to such explicit user input. As another example, users can provide implicit user input through their actions or lack thereof. For example, the content presentation application 185 can utilize the audio/video input device 145 to determine that the users 130 are no longer paying attention to the display device 120 while the content presentation application 185 is displaying the advertisement 192, such as, for example, by determining that the users' focus is no longer directed to the display device 120. More specifically, and as will be recognized by those skilled in the art, the audio/video input device 145 can comprise a camera, microphone or other sensors that can determine physical attributes and aspects of the physical scene to which the audio/video input device 145 is directed, thereby allowing users to, for example, provide input through physical motion, sound, or other like actions. The sensors of such an audio/video input device can, consequently, be utilized to detect aspects of users' focus, such as the direction in which one or more users are facing, including, for example, whether they are facing the display device 120 or not. As another example, the content presentation application 185 can utilize the audio/video input device 145 to determine that at least some of the users 130 have left the room while the content presentation application 185 is displaying the advertisement 192 on the display device 120 or, again, are otherwise focused elsewhere other than the display device 120. In such instances, the content presentation application 185 can elect to not invoke the other application, specified by the advertisement metadata 193.

According to one aspect, should the content presentation application 185 choose not to invoke the other application, specified by the advertisement metadata 193, such as in response to explicit or implicit user input, the content presentation application 180 can so notify the advertising service, thereby enabling the advertising service to better tailor the subsequent advertisements provided to the content presentation application 185 in particular, and to other content presentation applications, executing on other content presentation devices, more generally.

The invocation, by the content presentation application 185, of another application to present content simultaneously with the content presentation application 185, can be facilitated by a multi-panel display control 182 of an operating system 181 executing on the content presentation device 110. Such a multi-panel display control 182 can enable the display area of the physical display device 120 to be divided into "panels" or content presentation areas that can be independently addressed, such as by the content presentation application 185 and the other application that is invoked by the content presentation application 185. For example, the exemplary display template 150 illustrates one mechanism of dividing the display area of the physical display device 120 into a primary content display area 151 and a secondary content display area 152. In such an exemplary display template 150, the content being presented by the content presentation application 185 can be presented within the primary content display area 151, while the content presented by another application, such as one invoked by the content presentation application 185, in accordance with the advertising metadata 193, can be, simultaneously, displayed in the secondary content display area 152. Thus, as one specific example, the content presentation application 185 can display the advertisement 192 in the primary content display area 151, which, for purposes of the present example, can be an advertisement for pizza. Simultaneously, another application, such as the dedicated advertiser application 187, can be invoked by the content presentation application 185, in response to explicit or implicit user input, and can display, within the secondary content display area 152, additional content, such as, continuing with the present example, a pizza building and ordering application from the same pizza restaurant whose advertisement is currently being displayed in the primary content display area 151.

As another illustrative example, the content presentation application 185 can display the advertisement 192 in the primary content display area 151, which, for purposes of the present example, can be an advertisement for a travel service, while another application such as, for example, a communication application 188, which can have been invoked by the content presentation application 185 in accordance with the advertisement metadata 193, can execute on the content presentation device 110 and can display, within the secondary content display area 152 an audio/video communicational connection with, for example, the advertised travel service.

Depending on the nature of the other application, the information sought to be presented thereby, and the desires of the advertiser, multiple different display templates can be made available, such as by the multi-panel display control 182. For example, another exemplary display template 160 is illustrated in FIG. 1, and can also comprise a primary content display area 161, and a secondary content display area 162, except that, as can be seen, the display template 160 can size the primary content display area 161 with the same proportions as the overall display area of the display device 120, thereby avoiding cropping or black bars. Similarly, the secondary content display area 162 can be increased in order to display multiple different types of content. For example, the dedicated advertiser application 187 can include other functionality that can cause one or more of the users 130 to desire to interact with the dedicated advertiser application 187. For example, the dedicated advertiser application 187 can display scores of other sporting events, while the sporting event that the users 130 were watching can be displayed within primary content display area 161. In such an example, the lower portion of the secondary content display area 162 can be utilized, by the dedicated advertiser application 187, to display the scores of other sporting events, while the right-hand portion of the secondary content display area 162 can be utilized to display, for example, advertising content.

While illustrated within the context of a primary content display area, and one secondary content display area, the multi-panel display control 182 can enable two or more secondary content display areas. For example, the exemplary display template 170 illustrates one primary content display area 171 and two secondary content display areas, namely the secondary content display area 172 and the secondary content display area 173. Such an exemplary display template 170 can enable one application to control both of the secondary content display areas 172 and 173, or it can enable the content presentation application 185 to invoke two other applications, with one such other application displaying content within the secondary content display area 172, and the other one of such applications displaying content within the secondary content display area 173. As yet another example, the content presentation application 185 can invoke another application to display content within the secondary content display area 172, and that other application can invoke a still further application, which can then display content within the content display area 173.

According to one aspect, the operating system 181 of the content presentation device 110, can include a multi-panel advertisement interface 183 that can facilitate the exchange of communications and notifications between the content presentation application 185 and another application that is simultaneously displaying content, such as within a secondary content display area. Such communications can enable the other application to communicate with the content presentation application 185, and vice versa, thereby enabling user action directed to the secondary content display area to affect the presentation of content within the primary content display area, and vice versa. Alternatively, or in addition, such communications can enable events occurring within the context of the display of content, such as within the primary content display area, to trigger events when in the context of the content being displayed in the secondary content display area. For example, returning to the above example of a pizza advertisement, within the primary content display area, and a pizza building and ordering application displaying content within the secondary content display area, as different specialty pizzas are advertised by the advertisement within the primary content display area, the content being presented by the pizza building and ordering application within the secondary content display area can automatically update to enable the users 130 to customize the specialty pizza being advertised at that time.

The bidirectional notification enabled by the multi-panel advertising interface 183 need not be limited to advertisements being presented within the primary content display area. More specifically, according to one aspect, the other application, invoked by the content presentation application 185 in accordance with the advertisement metadata 193, can continue to execute, and display content within the secondary content display area, even after the completion of the display of the advertisement 192 in the primary content display area. Thus, for example, if the advertising-sponsored content that the users 130 were watching was a sporting event, the content presentation application 185 can return to displaying such content, within the primary content display area, upon completion of a current ad break, while the other application such as, for example, in the present example, the dedicated advertiser application 187, can continue to execute and display content within the secondary content display area. The content displayed within the secondary content display area can be triggered by events within the content being displayed within the primary content display area. For example, if a team that the users 130 were watching scores, as displayed within the primary content display area, the dedicated advertiser application 187, as an example, can display advertising content in the secondary content display area offering, for example, a discount due to the score. As another example, if the sporting event being displayed within the primary content display area reaches halftime, the dedicated advertiser application 187, as an example, can display advertising content in the secondary display area indicating that if the users 130 order now, their pizza can be delivered before the end of halftime.

While the above examples have been provided within the context of explicit advertising, the mechanisms described herein are not so limited. For example, the other application, displaying within the secondary content display area, can provide additive content to the content being displayed in the primary content display area. For example, returning to the above example where the content being displayed within the primary content display area is a sporting event, the content being displayed within the secondary content display area can provide an alternative camera angle, analysis, instant replays, or other like additive content. In such an example, the advertising can be more discreet such as, for example, a simple textual indication that the additive content is being brought to the users 130 by a specific advertiser.

To facilitate the bidirectional notifications described, according to one aspect, the multi-panel advertisement interface 183 can define a default set of triggers that can serve as the basis for notifications or registrations therefor. For example, the multi-panel advertisement interface 183 can define generic triggers for sporting events that can include, for example, the scoring of points, a timeout, halftime, and other like generic triggers. Other applications, such as, for example, the dedicated advertiser application 187, can then register to receive notifications based upon such triggers. For example, the dedicated advertiser application 187 can request that the content presentation application 185 notify it of each instance in which points are scored in a sporting event, should the content presentation application 185 be providing sporting event content. Such a registration, and subsequent notification, can be facilitated by the multi-panel advertisement interface 183. As another example, the multi-panel advertisement interface 183 can define generic triggers for video games that can include, for example, the killing of a character, the receiving of a bonus, the completion of a level, the exiting of the game to a game center, and other like generic video game triggers. Continuing with such an example, a communication application 188 can register to receive a notification, such as from the content presentation application 185, which, in the present example, can be a video game, to be notified each time one of the users 130 has their character killed. Subsequently, upon receiving such a notification, the communication application 188 can, for example, initiate an audio/video communication with a game helpdesk that can help the users 130 avoid having their characters killed. In such an example, the communication application 188 can register, such as with the multi-panel advertisement interface 183, to notify the content presentation application 185 of an event, such as, for example the granting of a new life to the user's character. Should the content presentation application 185 be capable of receiving such a notification, actions within the context of the other application, such as the communication application 188 of the present example, can impact events within the context of the content presentation application 185.

The multi-panel advertisement interface 183 can also provide for an extensible set of triggers by which application programs, such as the content presentation application 185 and various ones of the browser application 186, the dedicated advertiser application 187 and the communication application 188 can define and agree upon application-defined triggers.

Figure 2:
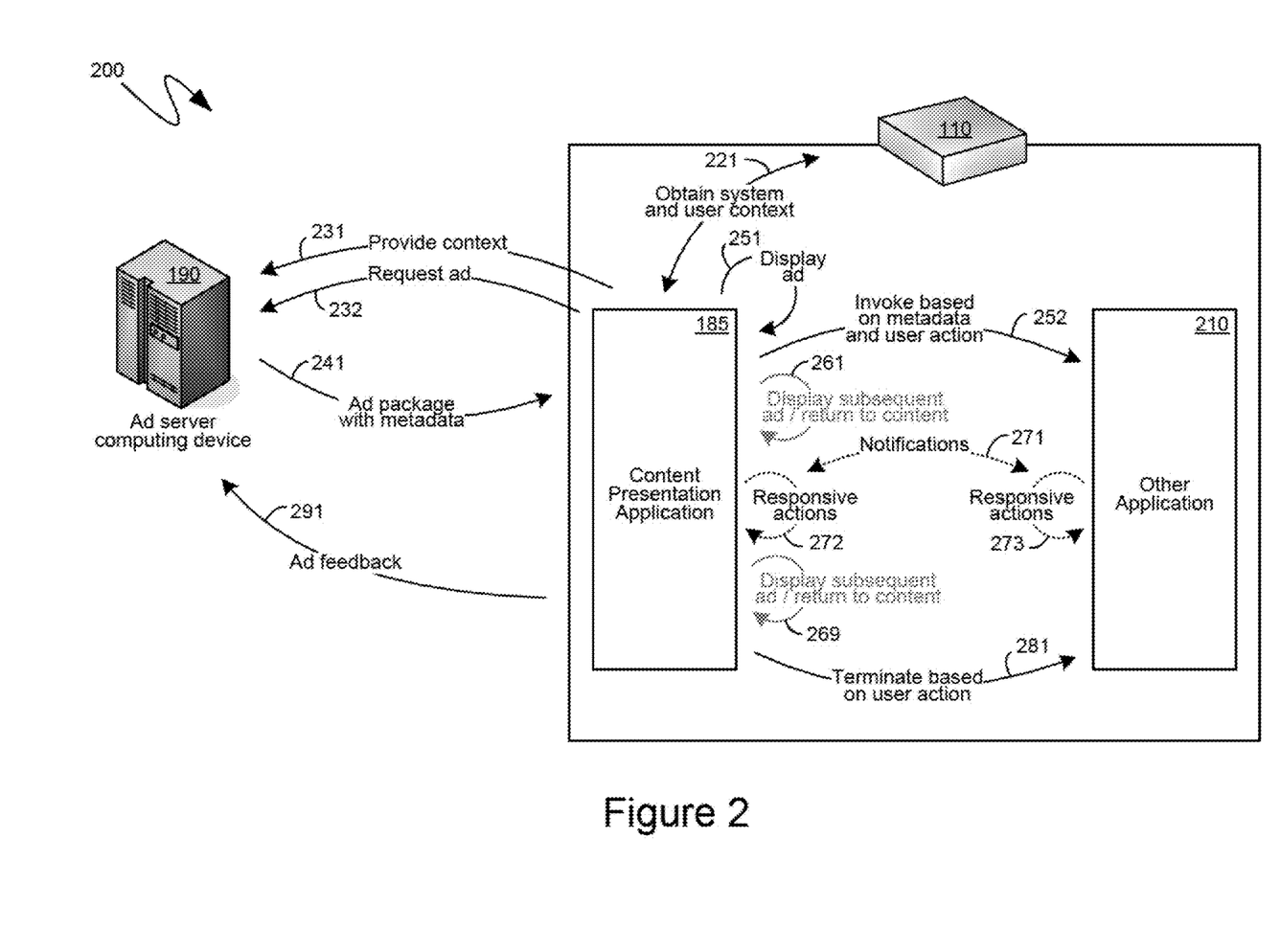
FIG. 2 is a block diagram of an exemplary sequence of communications facilitating simultaneous provision of content from two separate applications.

Turning to FIG. 2, the exemplary system 200 shown therein illustrates the bidirectional notification facilitated by the multi-panel advertisement interface 183. Initially, as illustrated by the exemplary system 200, the content presentation application, such as the exemplary content presentation application 185, executing on a content presentation device, such as exemplary content presentation device 110, can obtain information regarding the hardware and software context within which the content presentation application 185 is executing, as well as information about the user, to the extent that the user has authorized the collection of such data. As indicated previously, the information, collected by the content presentation application 185, and illustrated by the communications 221, can include information about the hardware of the content presentation device 110 and associated peripherals, information about the applications installed on the content presentation device 110, and other like software contextual information, as well as information about one or more users currently utilizing the content presentation device 110 to consume content including, for example, the quantity of such users, how the users are interacting with the content presentation device 110, and other like information. Subsequently, the content presentation application 185 can communicate with an advertisement service, represented by an exemplary advertisement server computing device 190, to provide the obtained context, as represented by the communication 231, and request one or more advertisements, as represented by the communication 232, that the content presentation application 185 can display during an appropriate ad break in the presentation of advertising-supported content, such as video games, television shows, sporting events, movies and other like advertising-supported content.

In response, the advertising service can select one or more advertisements, such as from among advertisements provided to the advertising service by one or more advertisers, based upon the context provided, such as via the communication 231, the requirements, or limitations, of the advertisements available to the advertising service, and other like considerations. According to one aspect, the advertisement selected by the advertising service can include advertisement metadata that can specify another application, such as the exemplary other application 210, which can be executed concurrently with the content presentation application 185, such as by the content presentation device 110, and can simultaneously display content together with the content being provided by the content presentation application 185, such as in the manner described in detail above. An advertisement package, comprising such an advertisement, and such advertisement metadata, can be returned from the advertising service to the content presentation application 185, as illustrated by the communication 241.

At an appropriate time, such as during an ad break, the content presentation application 185 can display the advertisement received via the communication 241, as illustrated by the action 251. Additionally, the content presentation application 185 can invoke the other application 210 that was specified by the advertisement metadata, received via the communication 241. More specifically, and as indicated previously, the content presentation application 185 can either solicit explicit user authorization for the invocation of the other application 210, or can monitor the user's behavior for an implicit authorization to invoke the other application 210. Should such implicit or explicit user authorization be received, the content presentation application 185 can invoke the other application 210, as illustrated by the action 252. The invocation of the other application 210, illustrated by the action 252, can occur during the display of the advertisement, illustrated by the action 251, but the mechanisms described herein are not so limited, and the invocation action 252 can occur either before or after the display 251 of the advertisement.

As described above, the content presentation application 185 and the other application 210 can simultaneously display content in two separate display areas. More specifically, the content presentation application 185 can display content, including-advertisement sponsored content and advertisements themselves, within a primary content display area, while the other application 210 can display content within a secondary display area. Additionally, as also described above, notifications 271 can be enabled between the other application 210 and the content presentation application 185, enabling actions or events occurring within the context of one display area to impact actions or events occurring within the context of the other display area. For example, one of the notifications 271 can provide input, to the other application 210, of when certain aspects of an advertisement are displayed by the content presentation application 185, thereby enabling the other application 210 to take a responsive action 273 such that, from the perspective of the user of the content presentation device 110, the content being displayed in a secondary display area, such as by the other application 210, is coordinated with the advertisement being displayed in a primary display area, such as by the action 251 of the content presentation application 185. As another example, one of the notifications 271 can provide input, to the other application 210, of when certain triggering events occur within the context of the presentation of content by the content presentation application 185. Such triggering events need not be part of the display of the advertisement, as represented by the action 251, but can, instead, be associated with the advertisement-supported content being displayed by the content presentation application 185. For example, one of the notifications 271 can notify the other application 210 that one of the sports teams, in a sporting event being presented by the content presentation application 185, has scored. As another example, one of the notifications 271 can notify the other application 210 that the user completed a level within the context of the video game being presented by the content presentation application 185. In each such exemplary instances, the other application can take one or more responsive actions 273, which can include the modification or updating of content being displayed by the other application 210 simultaneously with the content being displayed by the content presentation application 185.

The notifications 271 can also include notifications from the other application 210 back to the content presentation application 185. For example, the other application 210 can comprise a communication application through which a user can communicate with, for example, a help service that can aid the user in, for example, playing a video game. In such an instance, one of the notifications 271 can be a notification that, within the context of the other application 210, the help service has authorized the content presentation application 185 to, for example, provide the user with another life within the video game. The content presentation application 185 can then take an appropriate responsive action 272, such as providing the user with the other life.

As can be seen, the notifications 271 can be exchanged while the content presentation application 185 is displaying the advertisement whose metadata directed to the invocation of the other application 210, as represented by the action 251, or they can occur as part of the display, by the content presentation application 185, of the primary, advertising-supported content for which the user was utilizing the content presentation application 185. In the former case, the ending of the ad break, and the return to displaying such advertising-supported content can occur subsequent to the notifications 271, as illustrated by the action 269, while in the latter case it can occur prior to the notification 271, as illustrated by the action 261.

According to one aspect, the other application 210 can be terminated by the content presentation application 185, as illustrated by the action 281. Such a termination can be based on either explicit or implicit user action, and can occur at any point after the invocation of such other application, as illustrated by the action 252. For example, the invocation action 252 can have been triggered by implicit user input. Upon invoking the other application 210, the content presentation application 185 can receive explicit user input requesting that the other application 210 no longer execute and consume a portion of the content display area of the display device that is communicationally coupled to the content presentation device 110. In such an instance, the content presentation application 185 can terminate the other application 210, as illustrated by the action 181. As another example, the termination action 281 can be triggered by implicit user action. For example, upon invoking the other application 210, as illustrated by the action 252, the content presentation application 185 can detect user speech that is indicative of the user's desire to not have the other application 210 executed. For example, the content presentation application 185 can receive input indicative of the user exclaiming "I don't want this" when the other application 210 is first invoked, as represented by the action 252. In response, therefore, the content presentation application 185 can terminate the other application 210, as represented by the action 281. In an analogous manner, should the termination 281 be something that the user did not desire, the content presentation application 185 can re-invoke the other application 210. For example, subsequent to the termination action 281, the content presentation application 185 can receive input indicative of the user exclaiming "wait, where did that go", in response to which the content presentation application 185 can re-invoke the other application 210.

Additionally, the content presentation application 185 can provide feedback, as illustrated by the communication 291, to the advertising service. For example, if the content presentation application 185 was not allowed, by the user, to invoke the other application 210, the feedback 291 can indicate such to the advertising service, thereby enabling the advertising service to determine that the user of the content presentation device 110 is not interested in the additional content presented by the other application 210 in the specific context within which it was to be invoked. Such feedback 291 can then further inform subsequent decisions of the advertising service.

Figure 3:
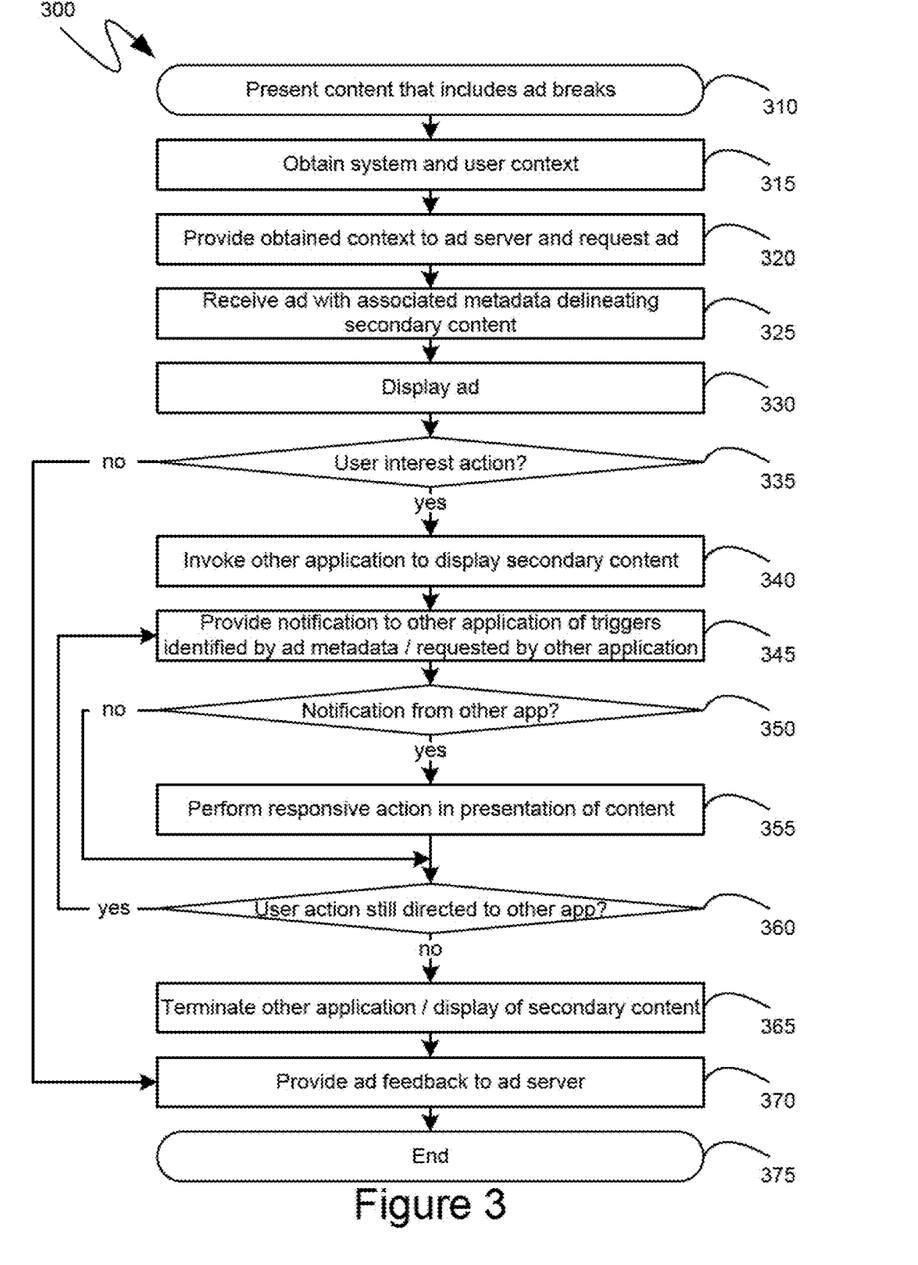
FIG. 3 is a flow diagram of a simultaneous provision of content from two separate applications.

Turning to FIG. 3, the flow diagram 300 shown therein illustrates an exemplary series of steps by which content from two applications can be simultaneously presented for the benefit of a user and an advertiser. Initially, at step 310, advertising-sponsored content that includes ad breaks can be presented to one or more users. Subsequently, at step 315, information regarding the hardware and software of the content presentation device through which such advertising-sponsored content is being presented, and associated peripherals, can be collected. Such contextual information can be provided to an advertising service, at step 320, and one or more advertisements can be requested therefrom. At step 325, one or more advertisements can be received from the advertising server, which can include advertisements provided with associated advertising metadata. At step 330, a received advertisement can be displayed to the user, such as during an appropriate ad break in the advertising-sponsored content.

During the display of the advertisement, at step 330, or otherwise as specified by the associated metadata or as triggered by either implicit or explicit user action, another application can be invoked. At step 335, as a threshold condition to the invocation of such another application, a determination can be made as to whether the user has provided any explicit or implicit action indicative of the user's authorization or acquiescence to the invocation of such another application. Should no such implicit or explicit action be detected, at step 335, processing can proceed to step 370, whereby feedback can be provided to the advertisement service. Such feedback can include an indication that the user did not allow the invocation of the other application, and did not wish to consume the secondary content that would've been presented by such another application. The relevant processing can then end at step 325.

Conversely, if, at step 335, an explicit or implicit user action is received indicative of the user's desire, or acquiescence, to the invocation of another application, such other application can be invoked at step 340. Subsequently, at step 345, a registration can occur between the application presenting the content of step 310 and the other application, including, for example, registration of specific triggers that are to initiate a notification from one application to the other, which can be generic triggers, or triggers specifically defined by both the application program presenting the advertisement-sponsored content of step 310 and the other application program. Additionally, at step 345, to the extent that one of the triggering events occurs, an appropriate notification can be generated and transmitted. As indicated previously, such triggering events can include events within the context of the content being presented, such as reaching a new level in a videogame or the occurrence of a score in a sporting event, as well as events triggered by user action, such as, for example, a user action to initiate an audio/video call, or a user action to place an order for a product or service through the other application.

At step 350, a determination can be made as to whether notification from the other application is received, if such a notification is received, then a responsive action can occur at step 355. As indicated previously, such a responsive action can occur within the context of the presentation of content. For example, a responsive action can include the modification of the context within which a video game is being played, such as, for example, providing the user with the new life. If no notification is received from the other application, at step 350, or if the responsive action has already been performed, at step 355, processing can proceed the step 360 at which point a determination can be made as to whether the user still desires to interact with, or to consume content from, the other application that was invoked at step 340. If it is determined, through either explicit or implicit user action, that the user desires to still interact with, or consume content from, such other application, processing can loop back to step 345. Conversely, if, at step 360, it is determined that the user no longer desires to interact with, or consume content from, such other application, processing can proceed to step 365 and such other application can be terminated. Feedback regarding the user's interaction, or lack thereof, and then be returned to an advertising service at step 370, and the relevant processing can end at step 375.

Figure 4:
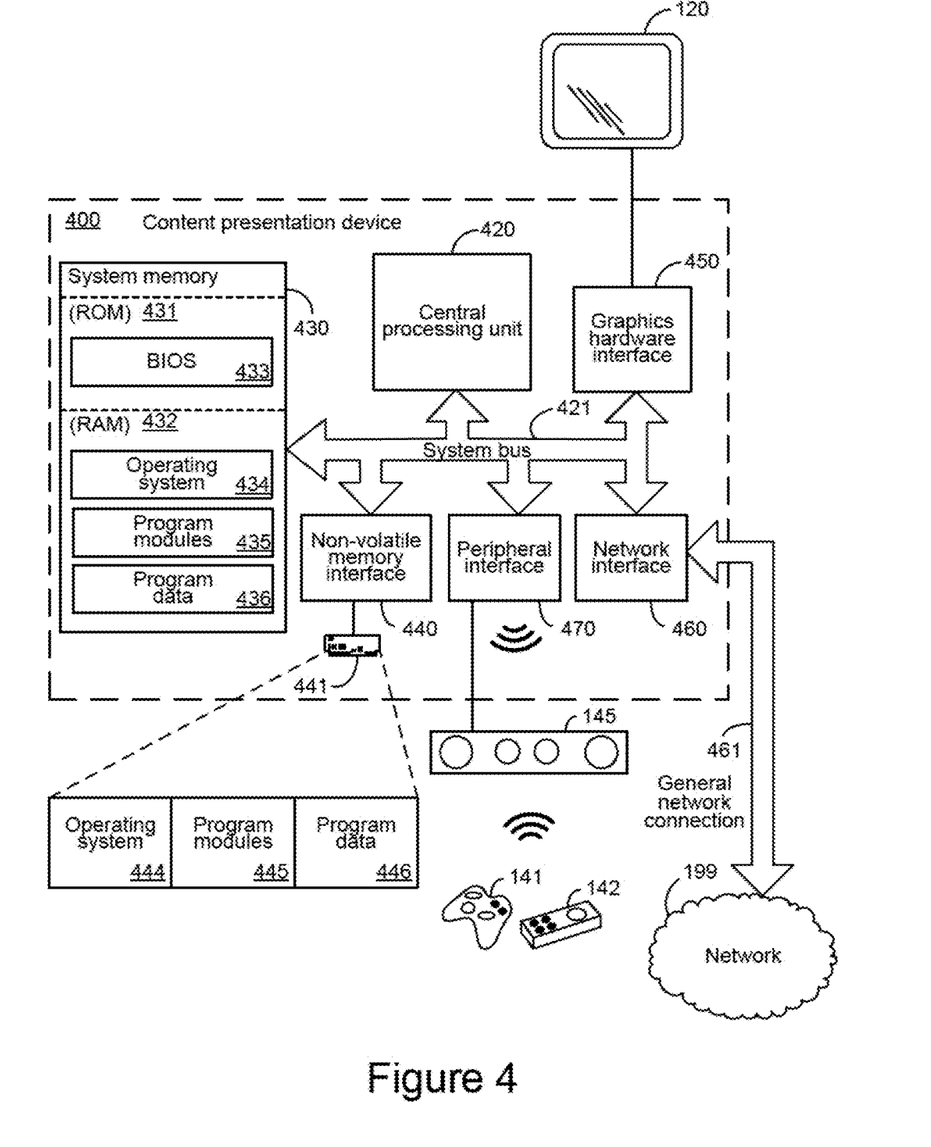
FIG. 4 is a block diagram of an exemplary content presentation device.

Turning to FIG. 4, an exemplary content presentation device 400 is illustrated which can perform some or all of the mechanisms and actions described above. The exemplary content presentation device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The content presentation device 400 can include graphics hardware, including, but not limited to, a graphics hardware interface 450 and the display device 120, described previously. Depending on the specific physical implementation, one or more of the CPUs 420, the system memory 430 and other components of the content presentation device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The content presentation device 400 also typically includes computer readable media, which can include any available media that can be accessed by content presentation device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 400. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within content presentation device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The content presentation device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the content presentation device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The content presentation device 400 may operate in a networked environment using logical connections to one or more remote computers. The content presentation device 400 is illustrated as being connected to the general network connection 461 through a network interface or adapter 460, which is, in turn, connected to the system bus 421. In a networked environment, program modules depicted relative to the content presentation device 400, or portions or peripherals thereof, may be stored in the memory of one or more computing devices that are communicatively coupled to the content presentation device 400 through the general network connection 461. For example, at least some of the program models 445 and program data 446 can be stored on computer-readable storage media remote from the content presentation device 400 and accessible by the content presentation device 400 over the network 199 via the general network connection 461 shown in FIG. 4. In such an instance, the relevant portions of the program modules 445 and/or program data 446 can be streamed or otherwise communicated in real-time or in pseudo-real-time to the content presentation device 400 to be executed and/or utilized thereby in the same manner as if such program modules 445 and/or program data 446 were stored on a local storage device of the content presentation device 400, such as, for example, the hard disk drive 441. It will be appreciated that the network connections shown are exemplary and other means of establishing a communications link between computing devices may be used.

Additionally, the content presentation device 400 can also include, or communicate with, user interface and input peripherals, including, but not limited to the game controller 141, the remote control 142 and the audio/video input device 145 that were described previously with reference to FIG. 1. Other types of input peripherals can equally be utilized, including more traditional computing device input peripherals, such as a keyboard, a trackpad, or a mouse. The display 120 can, itself, be an input peripheral capable of receiving touch-based user input, such as a touch-sensitive, or multi-touch capable, display device. Such input peripherals can be communicationally coupled to the system bus 121 via a peripheral interface 470. Such communicational couplings can be wired, as exemplarily illustrated in FIG. 4 with the wired connection between the peripheral interface 470 and the audio/video input device 145, or they can be wireless, as exemplarily illustrated in FIG. 4 with the wireless connection between the peripheral interface 470 and the game controller 141 and the remote control 142.

Although described as a single physical device, the exemplary content presentation device 400 can be a virtual content presentation device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary content presentation device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a content presentation device for increasing user interaction performance, the content presentation device comprising: one or more processing units; a graphics hardware interface communicationally coupling the content presentation device to a physical display device such that computer-executable instructions being executed by the one or more processing units cause physical changes to the physical display device, thereby generating display content on the physical display device; a first application; and a content presentation application, different and independent from the first application, the content presentation application comprising computer-executable instructions which, when executed by at least some of the one or more processing units, cause the content presentation device to perform steps comprising: displaying, to a user, a user-desired content on the physical display device; receiving a first content to display on the physical display device during an interruption in the user-desired content, the first content differing from the user-desired content; receiving, with the first content, a first metadata specifying the first application; displaying the first content in a primary content display area on the physical display device; invoking the first application to display secondary content, differing from the first content, in a secondary content display area, differing from the primary content display area on the physical display device during at least some of the displaying of the first content in the primary content display area; and either receiving a notification from the first application of an action within a context of the secondary content or providing a notification to the first application of an action within a context of either the first content or the user-desired content.

A second example is the content presentation device of the first example, wherein the computer-executable instructions directed to invoking the first application are executed only if the user explicitly authorizes the invoking of the first application.

A third example is the content presentation device of the first example, wherein the content presentation application comprises further computer-executable instructions which, when executed by at least some of the one or more processing units, cause the content presentation device to perform further steps comprising: monitoring a focus of the user; and wherein further the computer-executable instructions directed to invoking the first application are executed in response to implicit user authorization comprising the user maintaining the focus on the physical display device subsequent to the interruption in the user-desired content and during at least a portion of the displaying of the first content on the physical display device.

A fourth example is the content presentation device of the first example, wherein the content presentation application comprises further computer-executable instructions which, when executed by at least some of the one or more processing units, cause the content presentation device to perform further steps comprising: registering a trigger upon which the notification from the first application is to be generated; and wherein further the computer-executable instructions directed to providing the notification to the first application are executed in response to a trigger, previously registered by the first application, identifying a specific event within the context of the display of either the first content or the user-desired content.

A fifth example is the content presentation device of the fourth example, wherein the triggers are pre-defined by a multi-panel interface of an operating system of the content presentation device, the content presentation device further comprising the operating system with the multi-panel interface.

A sixth example is the content presentation device of the first example, wherein the content presentation application comprises further computer-executable instructions which, when executed by at least some of the one or more processing units, cause the content presentation device to perform further steps comprising: transmitting a device context to a service from which the first content was received, the device context comprising at least one of: an indication of applications installed on the content presentation device, a listing of peripherals communicationally coupled to the content presentation device or user information regarding one or more users viewing the user-desired content on the physical display device.

A seventh example is the content presentation device of the first example, wherein the user-desired content is advertising-sponsored content comprising at least one of: a show, a movie or a video game; and wherein further the first content is an advertisement and the interruption is an ad break.

An eighth example is the content presentation device of the first example, wherein the content presentation device comprises at least one of the first application or the content presentation application by virtue of having access to them over a network to which the content presentation device is communicationally coupled.

A ninth example is the content presentation device of the first example, wherein the secondary content is additive to the user-desired content; and wherein further the first application displays the secondary content in the secondary content display area while the content presentation application displays the user-desired content in the primary content display area.

A tenth example is a method for increasing user interaction performance, the method comprising the steps of: receiving a first content to display on a physical display device during an interruption in user-desired content being displayed on the physical display device, the first content differing from the user-desired content; receiving, with the first content, a first metadata specifying another application; causing display of the first content in a primary content display area on the physical display device; invoking the other application to cause display of secondary content, differing from the first content, in a secondary content display area on the physical display device, differing from the primary content display area on the physical display device during at least some of the displaying of the first content in the primary content display area; and either receiving a notification from the other application of an action within a context of the secondary content or providing a notification to the other application of an action within a context of either the first content or the user-desired content.

An eleventh example is the method of the tenth example, wherein the invoking the other application is performed only if the user explicitly authorizes the invoking of the other application.

A twelfth example is the method of the tenth example, further comprising the steps of: monitoring a focus of the user; wherein the invoking the other application is performed in response to implicit user authorization comprising the user maintaining the focus on the physical display device subsequent to the interruption in the user-desired content and during at least a portion of the displaying of the first content on the physical display device.

A thirteenth example is the method of the tenth example, further comprising the steps of: registering a trigger upon which the notification from the other application is to be generated; and wherein further the providing the notification to the other application is performed in response to a trigger, previously registered by the other application, identifying a specific event within the context of the display of either the first content or the user-desired content.

A fourteenth example is the method of the tenth example, further comprising the steps of: transmitting a device context to a service from which the first content was received, the device context comprising at least one of: an indication of applications installed on a device performing the method, a listing of peripherals communicationally coupled to the device or user information regarding one or more users viewing the user-desired content on the physical display device.

A fifteenth example is the method of the tenth example, wherein the user-desired content is advertising-sponsored content comprising at least one of: a show, a movie or a video game; and wherein further the first content is an advertisement and the interruption is an ad break.

A sixteenth example is method of the tenth example, wherein the secondary content is additive to the user-desired content; and wherein further the other application displays the secondary content in the secondary content display area while the user-desired content is displayed in the primary content display area.

A seventeenth example is a system comprising: a content presentation device configured to perform steps comprising: transmitting a context of the content presentation device comprising at least one of: an indication of applications installed on the content presentation device, a listing of peripherals communicationally coupled to the content presentation device or user information regarding one or more users viewing user-desired content on a physical display device that is communicationally coupled to the content presentation device; receiving an advertisement to display on the physical display device during an ad break in the user-desired content; receiving advertisement metadata specifying an application; causing display of the advertisement in a primary content display area on the physical display device; and invoking the application to cause display of secondary content, differing from the advertisement, in a secondary content display area on the physical display device, differing from the primary content display area on the physical display device during at least some of the displaying of the advertisement in the primary content display area; and an advertising server computing device configured to perform steps comprising: receiving the context of the content presentation device; selecting the advertisement based on the context of the content presentation device indicating that the application is already installed on the content presentation device; transmitting the advertisement to the content presentation device; and transmitting the advertisement metadata to the content presentation device.

An eighteenth example is the advertising system of the seventeenth example, wherein the secondary content is additive to the user-desired content; and wherein further the application causes display of the secondary content in the secondary content display area while the user-desired content is displayed in the primary content display area.

A nineteenth example is the advertising system of the seventeenth example, wherein the content presentation device is further configured to perform steps comprising: monitoring a focus of the user; and wherein further the invoking the application is performed in response to implicit user authorization comprising the user maintaining the focus on the physical display device subsequent to the ad break and during at least a portion of the displaying of the advertisement.

A twentieth example is the advertising system of the seventeenth example, wherein the content presentation device is further configured to perform steps comprising: either receiving a notification from the first application of an action within a context of the secondary content or providing a notification to the first application of an action within a context of either the first content or the user-desired content.

As can be seen from the above descriptions, mechanisms for increasing user interaction performance with a content presentation device have been presented. In view of the many possible variations of the subject matter described herein, we claim as our invention all such embodiments as may come within the scope of the following claims and equivalents thereto.

We claim:

1. A content presentation device for increasing user interaction performance, the content presentation device comprising:
   one or more processing units;
   a graphics hardware interface communicationally coupling the content presentation device to a physical display device such that computer-executable instructions being executed by the one or more processing units cause physical changes to the physical display device, thereby generating display content on the physical display device;
   a first application; and
   a content presentation application, different and independent from the first application, the content presentation application comprising computer-executable instructions which, when executed by at least some of the one or more processing units, cause the content presentation device to:
      display, to a user, a user-desired content on the physical display device, the user-desired content being advertising-sponsored content comprising at least one of: a show, a movie or a video game;
      receive a first content to display on the physical display device during an interruption in the user-desired content, the first content differing from the user-desired content, the first content being an advertisement and the interruption being an ad break;
      receive, with the first content, a first metadata specifying the first application;
      display the first content in a primary content display area on the physical display device;
      invoke, in response to an explicit user authorization, the first application to display secondary content, differing from the first content and additive to the user-desired content, in a secondary content display area, differing from the primary content display area on the physical display device during at least some of the displaying of the first content in the primary content display area and also during at least some of the displaying of the user-desired content in the primary content display area; and
      either receive a notification from the first application of an action within a context of the secondary content or provide a notification to the first application of an action within a context of either the first content or the user-desired content.

2. The content presentation device of claim 1, wherein the content presentation application comprises further computer-executable instructions which, when executed by at least some of the one or more processing units, cause the content presentation device to: monitor a focus of the user; and terminate execution of the first application if the focus of the user is not directed to the physical display device.

3. The content presentation device of claim 1, wherein the content presentation application comprises further computer-executable instructions which, when executed by at least some of the one or more processing units, cause the content presentation device to: register a trigger upon which the notification from the first application is to be generated; and wherein further the computer-executable instructions directed to providing the notification to the first application are executed in response to a trigger, previously registered by the first application, identifying a specific event within the context of the display of either the first content or the user-desired content.

4. The content presentation device of claim 3, wherein the triggers are pre-defined by a multi-panel interface of an operating system of the content presentation device, the content presentation device further comprising the operating system with the multi-panel interface.

5. The content presentation device of claim 1, wherein the content presentation application comprises further computer-executable instructions which, when executed by at least some of the one or more processing units, cause the content presentation device to: transmit a device context to a service from which the first content was received, the device context comprising at least one of: an indication of applications installed on the content presentation device, a listing of peripherals communicationally coupled to the content presentation device or user information regarding one or more users viewing the user-desired content on the physical display device.

6. The content presentation device of claim 1, wherein the content presentation device comprises at least one of the first application or the content presentation application by virtue of having access to them over a network to which the content presentation device is communicationally coupled.

7. The content presentation device of claim 1, wherein the content presentation application comprises further computer-executable instructions which, when executed by at least some of the one or more processing units, cause the content presentation device to perform, in response to the receipt of the notification from the first application, a responsive action within the display of the user-desired content.

8. The content presentation device of claim 1, wherein the content presentation application comprises further computer-executable instructions which, when executed by at least some of the one or more processing units, cause the content presentation device to terminate execution of the first application, thereby ceasing display of the secondary content in the secondary content display area, in response to an explicit user action requesting that the first application no longer display the secondary content.

9. A system comprising:
   a content presentation device configured to perform steps comprising:
      transmitting a context of the content presentation device comprising at least one of: an indication of applications installed on the content presentation device, a listing of peripherals communicationally coupled to the content presentation device or user information regarding one or more users viewing user-desired content on a physical display device that is communicationally coupled to the content presentation device;
      receiving an advertisement to display on the physical display device during an ad break in the user-desired content;
      receiving advertisement metadata specifying an application;
      causing display of the advertisement in a primary content display area on the physical display device;
      invoking, in response to an explicit user authorization, the application to cause display of secondary content, differing from the advertisement and additive to the user-desired content, in a secondary content display area on the physical display device, differing from the primary content display area on the physical display device during at least some of the displaying of the advertisement in the primary content display area and also during at least some of the displaying of the user-desired content in the primary content display area; and
      either receiving a notification from the application of an action within a context of the secondary content or providing a notification to the application of an action within a context of either the advertisement or the user-desired content; and
   an advertising server computing device configured to perform steps comprising:
      receiving the context of the content presentation device;
      selecting the advertisement based on the context of the content presentation device indicating that the application is already installed on the content presentation device;
      transmitting the advertisement to the content presentation device; and
      transmitting the advertisement metadata to the content presentation device.

10. The system of claim 9, wherein the content presentation device is further configured to perform steps comprising: monitoring a focus of the user; and terminating execution of the application if the focus of the user is not directed to the physical display device.

11. The system of claim 9, wherein the content presentation device is further configured to perform steps comprising: registering a trigger upon which the notification from the application is to be generated; and wherein further the providing the notification to the application is performed in response to a trigger, previously registered by the application, identifying a specific event within the context of the display of either the advertisement or the user-desired content.

12. The system of claim 9, wherein the content presentation device is further configured to perform steps comprising: transmitting a device context to the advertising server computing device, the device context comprising at least one of: an indication of applications installed on the content presentation device, a listing of peripherals communicationally coupled to the content presentation device or user information regarding one or more users viewing the user-desired content on the physical display device.

13. The system of claim 9, wherein the content presentation device comprises at least one of the first application or the content presentation application by virtue of having access to them over a network to which the content presentation device is communicationally coupled.

14. The system of claim 9, wherein the content presentation device is further configured to perform steps comprising: performing, in response to the receipt of the notification from the application, a responsive action within the display of the user-desired content.

15. One or more computer storage media comprising computer-executable instructions of a content presentation application, which, when executed by one or more processing units of a content presentation device, cause the content presentation device to:
   display, to a user, a user-desired content on a physical display device that is communicationally coupled to the content presentation device through a graphics hardware interface of the content presentation device such that computer-executable instructions being executed by the one or more processing units cause physical changes to the physical display device, thereby generating display content on the physical display device, the user-desired content being advertising-sponsored content comprising at least one of: a show, a movie or a video game;

receive a first content to display on the physical display device during an interruption in the user-desired content, the first content differing from the user-desired content, the first content being an advertisement and the interruption being an ad break;

receive, with the first content, a first metadata specifying a first application that is different and independent from the content presentation application, the content presentation device comprising the first application;

display the first content in a primary content display area on the physical display device;

invoke, in response to an explicit user authorization, the first application to display secondary content, differing from the first content and additive to the user-desired content, in a secondary content display area, differing from the primary content display area on the physical display device during at least some of the displaying of the first content in the primary content display area and also during at least some of the displaying of the user-desired content in the primary content display area; and either receive a notification from the first application of an action within a context of the secondary content or provide a notification to the first application of an action within a context of either the first content or the user-desired content.

16. The computer storage media of claim 15, further comprising computer-executable instructions, which, when executed by the one or more processing units of the content presentation device, cause the content presentation device to: monitor a focus of the user; and terminate execution of the other application if the focus of the user is not directed to the physical display device.

17. The computer storage media of claim 15, further comprising computer-executable instructions, which, when executed by the one or more processing units of the content presentation device, cause the content presentation device to: register a trigger upon which the notification from the first application is to be generated; and wherein further the providing the notification to the first application is performed in response to a trigger, previously registered by the first application, identifying a specific event within the context of the display of either the first content or the user-desired content.

18. The computer storage media of claim 15, further comprising computer-executable instructions, which, when executed by the one or more processing units of the content presentation device, cause the content presentation device to: transmit a device context to a service from which the first content was received, the device context comprising at least one of: an indication of applications installed on the content presentation device, a listing of peripherals communicationally coupled to the content presentation device or user information regarding one or more users viewing the user-desired content on the physical display device.

19. The computer storage media of claim 15, further comprising computer-executable instructions, which, when executed by the one or more processing units of the content presentation device, cause the content presentation device to: perform, in response to the receipt of the notification from the other application, a responsive action within the display of the user-desired content.

20. The computer storage media of claim 15, further comprising computer-executable instructions, which, when executed by the one or more processing units of the content presentation device, cause the content presentation device to: terminate execution of the other application, thereby ceasing display of the secondary content in the secondary content display area, in response to an explicit user action requesting that the other application no longer display the secondary content.

* * * * *